United States Patent [19]

Suzuki et al.

[11] Patent Number: 6,150,288

[45] Date of Patent: Nov. 21, 2000

[54] COMPOSITE OXIDE, COMPOSITE OXIDE CARRIER AND CATALYST

[75] Inventors: Tadashi Suzuki, Seto; Hideo Sobukawa, Nisshin, both of Japan

[73] Assignee: Kabushiki Kaisha Toyota Chuo Kenkyusho, Aichi-gun, Japan

[21] Appl. No.: 08/946,102

[22] Filed: Oct. 7, 1997

[30]  Foreign Application Priority Data

| Oct. 7, 1996 | [JP] | Japan | 8-266289 |
| Oct. 16, 1996 | [JP] | Japan | 8-273677 |
| Oct. 16, 1996 | [JP] | Japan | 8-273683 |

[51] Int. Cl.$^7$ ............... C04B 35/48; C04B 35/50; B01J 23/10; B01J 23/54

[52] U.S. Cl. ............... 501/105; 501/103; 502/304; 502/308; 502/313; 502/439; 502/527.12; 502/355

[58] Field of Search ............... 501/103, 105; 502/304, 308, 313, 439, 527.12, 355

[56]  References Cited

U.S. PATENT DOCUMENTS

| 4,221,768 | 9/1980 | Inoue et al. | 423/239 |
| 4,331,565 | 5/1982 | Schaefer et al. | 423/213.5 |
| 4,552,861 | 11/1985 | Courty et al. | 502/302 |
| 4,791,091 | 12/1988 | Bricker et al. | 502/303 |
| 4,868,150 | 9/1989 | Spooner et al. | 502/439 |
| 4,927,799 | 5/1990 | Matsumoto et al. | |
| 5,166,433 | 11/1992 | Irgang et al. | |
| 5,532,198 | 7/1996 | Chopin et al. | 502/304 |
| 5,550,096 | 8/1996 | Inoue et al. | 502/217 |
| 5,580,536 | 12/1996 | Yao et al. | 502/304 |
| 5,626,826 | 5/1997 | Chopin et al. | 502/304 |
| 5,658,546 | 8/1997 | Kobayashi et al. | 423/239.1 |
| 5,750,459 | 5/1998 | Marella et al. | 502/304 |
| 5,945,370 | 8/1999 | Yokoi et al. | 502/304 |
| 5,958,827 | 9/1999 | Suda et al. | 502/304 |

FOREIGN PATENT DOCUMENTS

| 0 628 515 | 12/1994 | European Pat. Off. |
| 0 684 072 | 11/1995 | European Pat. Off. |
| 0 684 073 | 11/1995 | European Pat. Off. |
| 44 23 346 | 1/1996 | Germany |
| 4-4043 | 1/1992 | Japan |
| 6-246155 | 9/1994 | Japan |
| 7-300315 | 11/1995 | Japan |
| 7-315840 | 12/1995 | Japan |
| 1 525 386 | 9/1978 | United Kingdom |
| WO 90/14888 | 12/1990 | WIPO |

OTHER PUBLICATIONS

Derwent Abstracts, Accession Number 96–266727, SU 1 413 777, Nov. 10, 1995.

*Primary Examiner*—Elizabeth D. Wood
*Attorney, Agent, or Firm*—Oblon, Spivak, McClelland, Maier & Neustadt, P.C.

[57]  ABSTRACT

The composite oxide and the composite oxide carrier are manufactured by the precursor forming step and firing step. The precursor forming step includes high speed mixing means. The composite oxide catalyst is obtained by preparing a composite of catalytic components simultaneously with the formation of the precursor of composite oxide in the step of forming the precursor of composite oxide. The composite oxide and the composite oxide carrier are composed of a composite oxide in which at least one of cerium and zirconium, and aluminium disperse with extremely high homogeneity. With this structure, the heat resistance of the carrier is improved and consequently, enlargement of particles of the composite oxide defining the carrier, and sintering of adjacent particles of the composite oxide can be restrained, whereby the catalyst using the composite oxide carrier in accordance with the present invention is excellent in heat resistance. With the present invention, the carrier is not limited to a general catalyst carrier. The carrier may be interpreted to indicate general formed bodies. For example, the carrier with the present invention can be also used as materials for sensors and electrodes, optical materials, semiconductors and structure materials. Furthermore, the carrier can be used for a three-way catalyst, NOx catalyst or oxidation catalyst or a part thereof, and a promoter.

32 Claims, 1 Drawing Sheet

COMPOSITE OXIDE, COMPOSITE OXIDE CARRIER AND CATALYST

BACKGROUND OF THE INVENTION

1. Field of the Invention

The present invention relates to a composite oxide, a composite oxide carrier and a composite oxide catalyst.

2. Description of the Related Arts

In the case where three-way catalysts for reducing exhaust gases are exposed to a high temperature atmosphere, the oxygen storage capacity (hereinafter will be merely called OSC) achieved by ceria therein decreases. This is caused by sintering of active catalytic elements such as platinum (Pt) or palladium (Pd), and a promoter such as ceria, oxidation of the active catalytic metals, dissolution of rhodium (Rh)to a catalyst carrier, or the like. Furthermore, in the case where catalysts have low OSC, the active catalytic metals tend to be exposed to a changing atmosphere and consequently, the deterioration (coagulation and dissolution) of the active catalytic metals (platinum, palladium and rhodium) may be unfavorably accelerated.

Japanese patent application laid-open No. Hei 4-4043 discloses an oxide carrier in which alumina ($Al_2O_3$), ceria ($CeO_2$) and zirconia ($ZrO_2$) are co-precipitated to disperse zirconia between the other elements to solve the above problem. And Japanese patent application laid-open No. Hei 7-300315 discloses an oxide carrier in which cerium and zirconium ions are precipitated by adding electrified particles of alumina thereto. However, by using the co-precipitation method and mixing ratio disclosed herein, the dispersing characteristics of the component elements were not so enhanced as to improve OSC and the ratio of purification.

Japanese patent application laid-open No. Hei 7-315840 discloses an aluminum oxide-cerium oxide-zirconium oxide containing compound carrier which is formed by mixing a precipitate obtained from a solution containing a cerium salt and a zirconium salt with alumina powder. However, by the method disclosed therein, composite oxide carriers of which component elements exhibit high dispersing characteristics, cannot be manufactured.

Furthermore, carriers prepared by impregnating alumina powder with a solution containing a cerium salt and a zirconium salt exhibit high dispersing characteristics of a cerium oxide and a zirconium oxide, but the composite (solid solution) of the cerium oxide and the zirconium oxide is insufficient.

Another catalyst including a carrier obtained from a mixture of active alumina powder and ceria-zirconia composite oxide powder, which adsorbes and carries noble metals, has been also known. The catalyst thus arranged was, however, insufficient in OSC at low temperatures.

SUMMARY OF THE INVENTION

It is an object of the present invention to provide a composite oxide, a composite oxide carrier in which component elements disperse with high homogeneity, and more particularly a composite oxide catalyst crystallites of oxides of cerium and/or zirconium and secondary particles thereof, of which the sizes are decreased to a predetermined value or less, to enhance the heat resistance thereof as a composite oxide and a catalyst carrier, and a composite oxide-containing catalyst in which the particle growth of an active catalytic metal and solid solution thereof into a carrier are restrained even at elevated temperatures to exhibit an excellent hest resistance.

In the case where a basic solution is added to a solution of salts of component elements gradually, the component element which is easy to precipitate at a low pH value, such as zirconium hydroxide, first precipitates due to the difference in pH value at which the component elements precipitate, thereby forming coagulated bodies, each being composed of a single component element, and then, the remaining component elements precipitate to form another coagulated bodies and consequently, objective high dispersing characteristics of component elements cannot be obtained. This results in insufficient preparation of a composite (solid solution) even after fired.

To overcome this problem, the present inventors have studied intensively, and as a result, completed the present invention.

A composite oxide manufactured by the method comprising the steps of forming a precursor of oxides from an aqueous solution of salts of a plurality of elements within several seconds, and then firing the precursor.

A composite oxide manufactured by the method comprising the steps of forming a precursor of oxides from high concentration salts of a plurality of elements, and then firing the precursor.

A composite oxide carrier manufactured by the method comprising the steps of forming a precursor of oxides composed of a plurality of elements by mixing a solution of salts of the plurality of elements of at least one of cerium (Ce) or zirconium (Zr), and aluminum (Al), with an alkaline solution by use of high speed mixing means, and then firing the precursor.

A composite oxide catalyst manufactured by the method comprising the steps of forming precursors of oxides of a plurality of elements and a catalyst metal by mixing a solution including salts of a plurality of elements of at least two of cerium, zirconium and aluminum and a salt of a catalyst metal with an alkaline solution by use of high speed mixing means, and by precipitating the precursors frog the mixed solution, and firing the precipitated precursors.

The composite oxide carrier and composite oxide catalyst in accordance with the present invention are respectively composed of a composite oxide in which at least one of cerium and zirconium, and aluminium, each defining the carrier, disperse with extremely high homogeneity. With this structure, the heat resistance of the carrier is improved and consequently, enlargement of particles of the composite oxide defining the carrier, and sintering of adjacent particles of the composite oxide can be restrained, whereby the catalyst using the composite oxide carrier in accordance with the present invention is excellent in heat resistance.

With the present invention, the carrier is not limited to a general catalyst carrier. The carrier may be interpreted to indicate general formed bodies. For example, the carrier with the present invention can be also used as materials for sensors and electrodes, optical materials, semiconductor materials and structure materials. Furthermore, the carrier can be used for a three-way catalyst, NOx catalyst or oxidation catalyst or a part thereof, and a promoter.

The composite oxide carrier and composite oxide catalyst in accordance with the present invention has characteristics resulted from the manufacturing method thereof. Namely, the composite oxide carrier and composite oxide catalyst in accordance with the present invention are characterized by the composite oxide manufactured by the method including the precursor forming step and firing step. The composite oxide-containing catalyst is obtained by preparing a composite of catalytic components simultaneously with the formation of the precursor of composite oxide in the step of forming the precursor of the composite oxide. The composite oxide carrier and composite oxide catalyst in accordance with the present invention are identical to each other in the point that the precursor of composite oxide is formed.

Hereinafter, the composite oxide carrier in accordance with the present invention will be first explained.

To manufacture the composite oxide carrier in accordance with the present invention, in the spep of forming a precursor, a solution of salts of a pluraltiy of elements including at least one of cerium and zirconium, and aluminium, which define the composite oxide, is first mixed with an alkaline solution with the use of high speed mixing means to form a precursor of oxide composed of the plurality of elements. The elements defining the carrier may include at least one of alkaline metal elements, alkali earth metal elements such as barium, transition metal elements such as yttrium, platinum, rhodium, palladium and iron, and rare earth metal elements such as lanthanum other than cerium, zirconium and aluminum.

The transition metal elements denote metals of Groups 1B, 2B, 3A, 4A, 5A, 6A, 7A and 8 of the fourth, fifth and sixth period of the periodic table. The alkali metals and alkaline earth metals denote elements of Groups 1A and 2A of the second through seventh period of the periodic table, such as lithium, sodium, potassium, beryllilum, magnesium and calcium.

The composite oxide may be $Al_2O_3/(Ce, Zr)O_2$, $Al_2O_3/ZrO_2$, $Al_2O_3/CeO_2$, $SiO_2/(Ce, Zr)O_2$, $SiO_2/TiO_2$, $ZrO_2/Sic$, $Al_2O_3/Pt$, $Al_2O_3/Rh$, $Al_2O_3/Pd$ or the combination thereof.

To disperse cerium and/or zirconium in alumina with high homogeneity, thereby obtaining a composite oxide, it is preferable that the atomic ratio of Al:(Ce+Zr) ranges from 1:0.01 to 1:5. The more preferred atomic ratio ranges from 1:0.01 to 1:2, from 1:0.01 to 1:1, from 1:0.05 to 1:2.

To obtain a catalyst carrier which carries noble metals securely, it is preferable that the composition ratio of alumina to zirconia is adjusted such that the atomic ratio of Al:Zr ranges from 1:0.01 to 1:5. The more preferred atomic ratio thereof ranges from 1:0.01 to 1:2, 1:0.02 to 1:1, 1:0.02 to 1:0.5, 1:0.05 to 1:2. The preferred atomic ratio of the total of aluminum and zirconium to that of the remaining additive elements ranges from 1:0.01 to 1:0.2.

To maintain a high OSC of the composite oxide carrier even after endurance test at a high temperature, it is preferable that the composition ratio of alumina, ceria and zirconia is adjusted such that the atomic ratio of Al:(Ce+Zr) ranges from 1:0.2 to 1:2, more preferably from 1:0.2 to 1:1, and that of Ce:Zr ranges from 1:5 to 1:0.2, more preferably from 1:0.8 to 1:1.25.

To carry noble metals securely, there is no need of adding ceria, but if a high OSC is needed, ceria must be added.

One or more kinds of additives out of alkali earth metals and rare earth metals such as barium and lanthanum may be used.

If the amount of these additive elements are too much, the heat resistance inversely decreases so as to be less preferable.

The component elements defining the composite oxide in accordance with the present invention, such as cerium, zirconium, aluminum or the like, are used in the form of salts. A plurality of component elements are dissolved in a solvent capable of dissolving the salts thereof homogeneously to prepare a salt solution. Examples of the salts of component elements include sulfate, nitrate, hydrochloride and acetate. Examples of the solvent for dissolving the salts of component elements homogeneously include water and alcohols. In addition, as a material of aluminum nitrate, a mixture of aluminum hydroxide, nitric acid and water may be used.

As the alkaline solution to be mixed with the solution of salts at a high speed, there can be used such a solution as to enable the formation of a precursor in which component elements are sufficiently composed or dissolved in a solid phase, to exhibit a high degree of dispersing characteristics. Examples of such alkaline solution include an aqueous solution and alcohol solution in which ammonia, ammonium carbonate, sodium hydroxide, potassium hydroxide, sodium carbonate or the like is dissolved.

It is preferable that the pH value of the alkaline solution is 9 or more, because the precipitation reaction of the precursor is accelerelated with such pH values.

The solution of salts of a plurality of component elements and the alkaline solution thus prepared are mixed together at a high speed with high speed mixing means. This results in precipitating by the neutralization operation of the alkaline solution, and the precursor of oxide is formed. The high speed mixing means denotes such means as to enable a solution (A) in which salts of component elements are dissolved homogeneously to be mixed with another solution (B) in which the same amount or more of basic substances as those of salts of the component elements are dissolved in a certain constant volume in an extremely short period of time (several seconds or less, preferably one second or less). This means is not limited to a specific means provided that the mixing time is short. The solution of salts and alkaline solution may be heated or pressed previously.

Examples of the high speed mixing means include: the means of preparing the solution (A) in a vessel of a predetermined volume, preparing the solution (B) in another vessel, pouring the solution (B) into the solution (A) while stirring the solution (A) strongly, and mixing together in an extremely short time; the means of mixing the solutions (A) and (B) inversely; the means of providing a circular plate which is rotatable at a high speed within a casing, and a receiving section for a mixure liquid and resulting precursor of oxide at the bottom of the casing, as shown in FIG. 1; pouring the solutions (A) and (B) on the rotating circular plate simultaneously to mix them thereon at a high speed with the use of a centrifugal force, and collecting a product at the bottom of the casing; and the means of rotating a spiral rotary vane rotatably provided within a cylinder-like casing at a high speed, as shown in FIG. 2, introducing the solution (B) into the solution (A), mixing them at a high speed and collecting a resultant precursor of oxide from an opening of the cylinder-like casing.

By mixing at a high speed, the difference in precipitation speed between precursors of various oxides, which is resulted from a minute difference in pH value between the solution of salts of the component elements and the alkaline solution, can be cancelled and consequently a soluble precursor of oxide and insoluble precursor of oxide can precipitate immediately and simultaneously, whereby a precursor of oxide having a desired composition and exhibiting homogeneous dispersing characteristics can be formed. Namely, since the precipitation speed can be increased by the high speed mixing means, the precipitation of a specific oxide prior to the other oxides can be prevented, thus, all the oxides precipitate simultaneously. This results in all of the oxides precipitating as a precursor homogeneously, and accordingly, the precursor can define fine particles dispersing with high homogeneity with a desired composition, regardless of the kinds of the component elements.

A resultant precursor of oxide may be separated from a mother solution with decantation or filteration, and residual salts may be diluted and removed with cleaning (washing) and purification. By adding a high-molecular coagulant, a surface active agent, a water-soluble polymer or the like to the mixture liquid or cleaning liquid in the step of separating the precursor, the separation efficiency can be improved, and the configuration of the precursor can be made good.

The decantation denotes the means of removing a supernatant liquid above the precursor of oxide precipitated at the bottom of the casing by flowing the supernatant liquid away gently, and recovering a residual precipitate. One example of the decantation is as follows. While stirring 10 l of the aqueous solution from which a precursor of composite oxide is precipitated, it is diluted to five times with another aqueous solution in which 0.5 g of ammonium carbonate is dissolved per liter of deionized water. Then, 12 liters of another aqueous solution containing 0.1% of high-molecular coagulant is added, and a resultant liquid is stirred gently and uniformly at a speed of about 40 rpm. Next, the liquid is allowed to stand for about 20 minutes and a resultant supernatant is removed. These operations are further repeated twice. The amount of the aqueous solution of high-molecular coagulant to be added at the second time is 4 liters.

Another example of the decantation is as follows. To remove impurities such as ammonium nitrate, which is contained in the aqueous solution from which a precursor of composite oxide including barium carbonate, is precipitated, while stirring the aqueous solution, it is diluted to five times with another aqueous solution in which 0.5 g of ammonium carbonate is dissolved per liter of deionized water. Then, a resultant solution is allowed to stand for about 1 day and a resultant supernatant is removed. These operations are further repeated twice to remove the impurities (ammonium nitrate) until the content thereof decreases to 1% or less. Next, the resultant solution is filtered with a filter press, whereby the content of ammonium nitrate in the pressed cake decreases to about 0.1%. The aqueous solution of ammonium carbonate used for decantation serves to prevent the re-dissolution of barium carbonate precipitated. If no soluble element such as barium is added, it is unnecessary to add ammonium carbonate. The method of decantation is not limited to these methods.

By removing impurities from the precursor of oxide, the preparation of a composite or solid solution of the component elements can be accelerated in the firing step of the precursor of composite oxide, and the amount of NOx generated in the firing step can be reduced. By adding a high-molecular coagulant, surface active agent, water-soluble polymer or hydrogen peroxide solution, both the efficiency of decantation and filtering characteristics can be improved, the volume of micro pores of the oxide carrier fired can be increased, and the preparation of a composite of the component elements can be accelerated.

More specifically, by the high-molecular coagulant, fine particles of precipitated precursor of composite oxide are adsorbed on normal chain-type polymers,each having tens of thousands of molecular weight, which define high-molecular coagulant, to form coagulated bodies, each having the size from about several mm to about 1 cm, which is called floc. This results in the increased precipitating speed of the precursor of oxide in decantation, and the cleaning efficiency being enhanced. Furthermore, since the precursor defines coagulated bodies, the succeeding filtering step becomes facilitated. In addition, by performing the filter pressing or belt pressing at a high speed with the use of a filter cloth with large meshes, the filtering time can be shortened.

The high-molecular coagulant, surface active agent and water-soluble polymer are not limited to specific kinds, respectively. Cationic, anionic, or nonionic polymer can be used. But, if sodium, sulfur, chlorine or the like remain in the catalyst, the catalytic activity may be deteriorated. Therefore, if possible, it is desirable to use nonionic polymer.

Examples of the high-molecular coagulant include a coagulant on the market, examples of the surface active agent include polyoxyethylene alkyl ether, and examples of the water-solublepolymer include cellulose polymer and polyvinyl alcohol.

By adding at least one of a high-molecular coagulant, a surface active agent, a water-soluble polymer and a carbon powder, pores can be formed in the composite oxide after fired. The pore volume depends on the kind and amount of polymer, but is not limited specifically. Furthermore, if hydrogen peroxide solution is added, the preparation of composite (solid solution) of component elements can be accelerated.

The precipitate separated and purified is dried and fired. The drying method is not limited specifically. Spray drying, air stream drying, vacuum drying or the like may be performed. If the high-molecular coagulant, water-soluble polymer or surface active agent used for cleaning (washing) remains in the firing step, it serves to form micro pores in a resultant oxide in the firing step to enhance the catalytic property. Furthermore, particulates powder such as carbon powder may be mixed to the resultant precipitate before firing.

Normally, it is preferable to carry out firing in air at 600° C. or more for 1 hour or more. Before firing in air, calcining may be performed in a stream of an inert gas such as nitrogen gas. Due to firing, the precursor of oxide is oxidized to form a composite oxide. The firing may be carried out in a reduced atmosphere at 500° C. or more, preferably 900° C. or more.

The resultant fired composite oxide can be formed into fine particles by pulverizing or other method. Thus, a composite oxide powder wherein component elements disperse with high homogeneity can be obtained easily.

The composite oxide obtained retains an approximately homogeneous dispersing state due to solid solution or the like of component elements. The preferred diameter of ceria-zirconia crystallites defining the composite oxide is 5 nm or less.

Furthermore, it is desirable for the composite oxide that the diameter of the ceria-zirconia crystallites is 10 nm or less, and 60% or more of cerium and zirconia contained in the composite oxide disperses as secondary particles of 30 nm or less, and more preferably 20 nm or less, even after the treatment in air at 1000° C. for 5 hours.

In this case, the diameter of a ceria-zirconia crystallite and particle is represented by the distance between alumina particles or atoms which intervene between ceria-zirconia crystallites and particles, and dispersing therein, or may be the distance between ceria-zirconia crystallites, particles or atoms which intervene between alumina particles and crystallites, and ceria-zirconia crystal, particle and atoms dispersing therein.

If the crystallite diameter and particle diameter in the composite oxide become larger than 30 nm, the compositon ratio of ceria and/or zirconia, which acts as a composite oxide carrier catalyst, decreases and consequently, the activation of noble metals decreases and OSC as the catalyst decreases, unfavorably decreasing the reducing performance of the three-way catalysts in a changing atmosphere. Furthermore, if the preparation of a composite (solid solution) of cerium oxide and zirconium oxide is insufficient, OSC and reducing performance both unfavorably decrease. In addition, deterioration (coagulation and solid solution into carrier) of the active catalytic metal (platinum, palladium, rhodium) to be carried is unfavorably accelerated.

By preparing a slurry of the composite oxide and pulverizing it while mixing with a pulverizer such as an attriter or ball mill, the diameter of the secondary particles of this composite oxide can be decreased to 3 μm φ or less on average, By coating a honeycomb substrate or the like with this composite oxide slurry, a resultant carrier can be used for the three-way catalyst for reducing exhaust gases from automobiles or the like.

The composite oxide in accordance with the present invention can further carry noble metals having catalytic activity, such as at least one of platinum, palladium and rhodium to define a catalyst. A monolith substrate of cordierite or metal is coated with a composite oxide which carries such noble metals, or the composite oxide is first carried on a monolith substrate, and then noble metal elements are further carried thereon to define a three-way catalyst for reducing exhaust gases. The resultant noble metal catalyst carried on this composite oxide carrier exhibits an excellent heat resistance, sulfur poisoning resistance and phosphorus poisoning resistance.

The composite oxide-containing catalyst in accordance with the present invention has the structure that noble metal elements are previously mixed in and dispersed in the above-described composite oxide. Noble metal elements are dissolved in the form of salts in the solution of salts, which a precursor of oxide. By mixing this solution of salts and an alkaline solution with the high speed mixing means, the precursor containing the noble metal elements and a plurality of elements defining the composite oxide can be obtained. And by firing the obtained precursor of oxide, a catalyst of composite oxide in which noble metals are mixed can be obtained.

It is preferable that the noble metal element is at least one of platinum, palladium and rhodium.

The composite oxide-containing catalyst in accordance with the present invention has the structure that the oxide containing at least two elements out of aluminum, cerium and zirconium, and noble metal elements are mixed together and dispersed homogeneously. With this structure, the properties of the noble metals are effectively achieved, and both the stability of the noble metals and dispersing characteristics of the component elements are enhanced. Accordingly, in the case of cerium and zirconium being contained, OSC at an evaluation temperature of 300° C. is improved by about twice or more, as compared to that of the conventional catalyst.

Since the noble metals disperse as fine particles in the composite oxide homogeneously, they become hard to coagulate and consequently, the resultant composite oxide catalyst in accordance with the present invention exhibits an excellent heat resistance, retains noble metals stably, achieves a high OSC and high conversion rate of HC, CO and NOx, and exhibits an excellent sulfur poisoning resistance and phosphorus poisoning resistance.

The amount of the noble metal elements as a catalyst is not limited specifically provided that a normal catalytic activity is exhibited. For example, about 0.05 to 20 g (0.02 to 10% by weight in a powder state) per liter of monolith catalyst may be used.

The composite oxide-containing catalyst in accordance with the present invention may further contain a stabilizer composed of an alkali earth metal, an alkaline metal, a transition metal, a rare earth metal or the like, such as barium (Ba), iron (Fe), lanthanum (La) or the like.

The composite oxide-containing catalyst in accordance with the present invention may be used in combination with a conventional catalyst or catalyst carrier (powders may be mixed together, or one part of the noble metals may be impregnated later).

Alternatively, the method of firing a precursor of oxide by using a salt solution of composite oxide having a high concentration, and an alkaline solution having a high concentration, and directly firing the precursor of oxide may be used. The following effects are achieved by this method. (1) No waste water treatment is needed. (2) While firing, impurities within the precursor are decomposed and separated. Consequently, the resultant composite oxide can be easily pulverized. (3) The composite oxide of a fine crystalline with a small diameter and of a fine particle with a small diameter can be synthesized because the high viscosity of precursors suppress. Brownian movement, impurities at a high concentration adsorbed in fine precipitates in the presursor made the precursor oxidized with suppressing the nucleus growth.

Such a concentration as to maintain the stable state of the salt solution and alkaline solution may be available as the high concentration. Alternatively, the solubility may be increased by applying heat or pressure.

Other objects, features, and characteristics of the present invention will become apparent upon consideration of the following description and the appended claims, with reference to the accompanying drawings, all of which form a part of this specification.

DETAILED DESCRIPTION OF THE PREFERRED EMBODIMENTS

Hereinafter, the present invention will be explained based on several embodiments.

Figure 1:
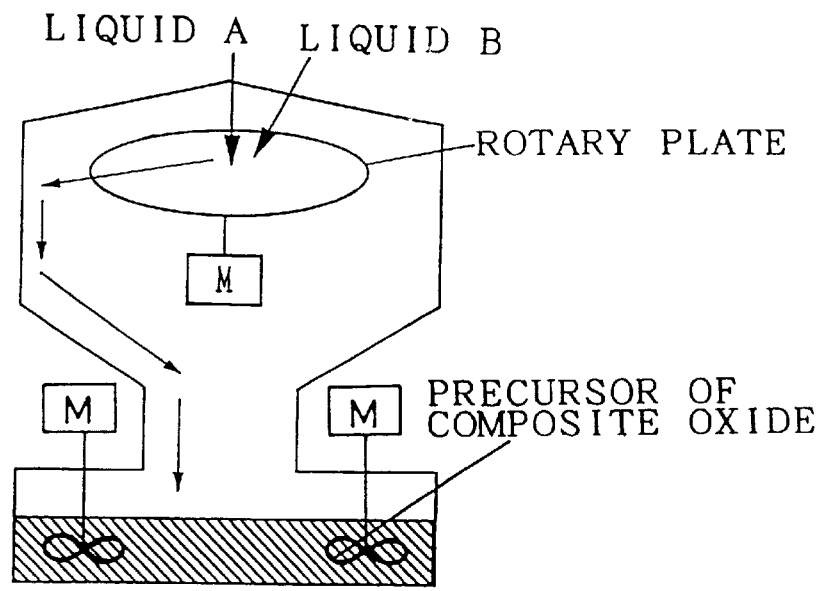
FIG. 1 is a schematic diagram of a device by which a high speed mixing is carried out on a rotary plate with the use of a centrifugal force.
Figure 2:
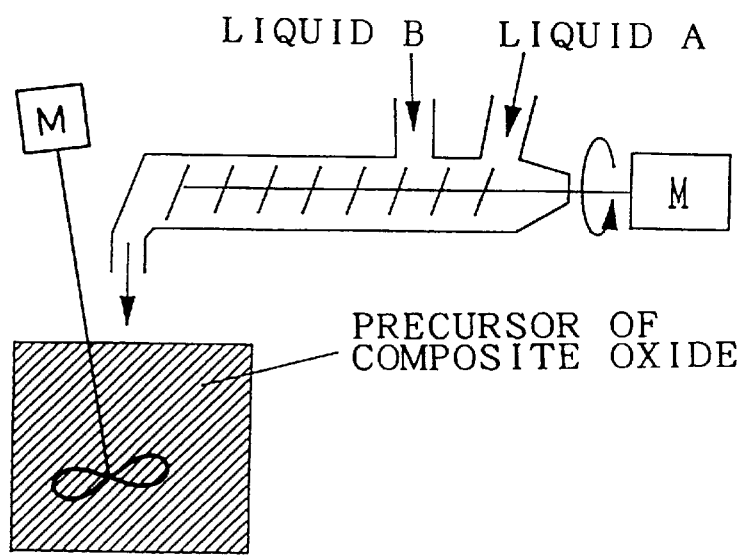
FIG. 2 is a schematic diagram of a device by which a high speed mixing is carried out with rotary vanes.

Embodiment 1:

An aqueous solution (liquid A) in which 2.35 mol of aluminium nitrate nonahydrate, 0.25 mol of zirconyl nitrate dihydrate, 0.25 mol of cerium nitrate (III), 0.05 mol of barium nitrate, and 5768 ml of deionized water were mixed together and dissolved, and another aqueous solution (liquid B) in which 8.312 mol of ammonia water, 0.075 mol of ammonium carbonate and 2400 ml of deionized water were mixed together and dissolved were prepared, respectively. Next, by using a high speed mixing device shown in FIG. 1, a circular plate was rorated at a speed of about 5000 rpm, and the liquids (A) and (B) were poured on the circular plate simultaneously at such a speed that these liquids are mixed together homogeneously wintnin one second.

The mixed liquid and precipitated precursor of oxide bumped against walls of a casing due to a centrifugal force and flowed down to be collected. Then, with decantation, a supernatant liquid was removed from the mixure of the mixed liquid and precipitated precursor of composite oxide, and a cleaning liquid was further added repeatedly to clean (wash) the precursor of composite oxide until the amount of ammonium nitrate contained in the cleaning liquid decreased to one tenth or less.

The decantation method is not limited specifically. To remove impurities such as ammonium nitrate within the mixed liquid from which the precursor of composite oxide was precipitated, it was diluted to five times with an aqueous solution in which 0.5 g of ammonium carbonate was dissolved per liter of deionized water while stirring. Then, the mixed liquid diluted was allowed to stand for one day and the supernatant liquid was removed until the amount of impurities (ammonium nitrate) decreased to 10% or less.

Next, a resultant mixed liquid was filtered with a filter press until the amount of ammonium nitrate contained in a resulting pressed cake decreased to about 1%.

The aqueous solution of ammonium carbonate serves to prevent the re-dissolution of barium carbonate precipitated.

The precursor of composite oxide thus obtained was dried at 105° C. for about 20 hours, and fired at 650° C. for 1 hour. Lumps of the precursor fired were pulverized with a ball mill to obtain a powdered composite oxide in which desired component elements disperse with homogeneity.

100 parts by weight of the pulverized composite oxide was mixed with 100 parts by weight of water, 20 parts by weight of aluminum nitrate nonahydrate and 5 parts by weight of boehmite, and stirred with an attriter for about two hours to obtain a slurry for a composite oxide carrier. A monolith substrate of cordierite of 400 cells/inch was coated with this slurry to obtain the composite oxide carrier for carrying catalytic metals, which was coated with 200 g of composite oxide per liter of catalyst volume.

The attriter is composed of a casing of zirconia, which has an inside volume of 6 liters, and 6 kg of zirconia balls, each having a diameter of 5 mm, which are filled in the casing. 2 kg of a raw material for composite oxide carrier slurry was introduced within the casing thus arranged, rotary vanes of zirconia were rotated at 150 rpm therein, thereby pulverizing and mixing the composite oxide carrier within the slurry until the particle diameter of the secondary particles of the composite oxide carrier powder for a catalyst carrier decreased to 3 μm or less on average.

In the present embodiment, the attriter thus arranged was used. Alternatively, a normally used ball mill may be used for pulverization and mixing. The pulverizing and mixing method is not limited specifically.

The composite oxide carrier thus treated was immersed in an aqueous solution of platinum nitrate to adsorb and carry 1.5 g of platinum per liter of catalyst volume. The composite oxide carrier carrying platinum was dried, fired at 250° C. for 1 hour, and immersed in an aqueous solution of rhodium nitrate to adsorb and carry 0.3 g of rhodium per liter of catalyst volume. Next, the composite oxide carrier carrying platinum and rhodium was dried and fired at 250° C. for 1 hour to obtain a noble metal-carrying catalyst.

The catalyst thus obtained was subjected to a model endurance test in a stream of air at 1000° C. for 5 hours. Then, the characteristics of the catalyst were analyzed.

As a result of the X-ray diffraction analysis, ceria and zirconia contained in the catalyst after endurance test were dissolved in a solid phase in the composite oxide homogeneously. The diameter of each crystallite was 4.6 nm. Secondary particles, each having a particle diameter of 5 to 10 nm, dispersed as a main component in a resultant alumina carrier homogeneously. No diffraction line due to barium was observed. This result can be considered to be caused by barium being dissolved in a solid phase in the composite oxide of alumina, ceria and zirconia. By the solid solution of barium, the heat resistance of the carrier is enhanced, and a high specific surface area is maintained.

The oxygen storage capacity (OSC) of this catalyst at 300° C. 500° C. and 700° C. was 0.08, 0.11 and 0.12 mol of oxygen gas ($O_2$) per mol of ceria, respectively. The specific surface area of this composite oxide ranged from 70 to 80 $m^2/g$.

TABLE 1

| Sample | state of solid solution of ceria & zirconia | diameter of crystallite nm | diameter of secondary particle nm | oxygen storage capacity $O_2$ mol/mol of ceria | | | Specific surface area $m^2/g$ | average ratio of purification (%) |
|---|---|---|---|---|---|---|---|---|
| | | | | 300° C. | 500° C. | 700° C. | | |
| Embodiment 1 | homogeneous | 4.6 | 5~10 | 0.08 | 0.11 | 0.12 | 73 | 95 |
| Embodiment 2 | homogeneous | 5.3 | 5~10 | 0.077 | 0.105 | 0.12 | 70 | 94 |
| Embodiment 3 | homogeneous | 5.8 | 5~10 | 0.075 | 0.103 | 0.12 | 68 | 96 |
| Embodiment 4 | homogeneous | 4.8 | 5~10 | 0.08 | 0.11 | 0.12 | 68 | 96 |
| Embodiment 5 | homogeneous | 5.0 | 5~10 | 0.078 | 0.107 | 0.12 | 65 | 97 |
| Embodiment 6 | homogeneous (lower layer) | 4.6 | 5~10 | 0.08 | 0.11 | 0.12 | 75 | 98 |
| Embodiment 7 | homogeneous (lower layer) | 6.2 | 16 | 0.07 | 0.11 | 0.12 | 78 | 98 |
| Comparative example 1 | inhomogeneous solid solution | measurement impossible | 30 | 0.04 | 0.08 | 0.09 | 60 | 83 |

Embodiment 2:

A catalyst was prepared by the method similar to that of Embodiment 1 except that 0.05 mol of barium nitrate which was one of component elements of the liquid A of Embodiment 1 was replaced with 0.05 mol of lanthanum nitrate hexahydrate, an aqueous solution in which 8.885 mol of ammonia water and 2400 ml of deionized water were mixed was used as the liquid B, and deionized water was used as the cleaning liquid. Then, the durability was evaluated. The characteristics of this catalyst are also shown in TABLE 1.

Embodiment 3:

A catalyst was prepared by the method similar to that of Embodiment 2 except that lanthanum nitrate hexahydrate which was one of the component elements of the liquid A of Embodiment 2 was not used.

The catalyst thus prepared was evaluated similarly to Embodiment 2. The characteristics of this catalyst are also shown in TABLE 1.

Embodiment 4:

A catalyst was prepared by the method similar to that of Embodiment 1 except that an aqueous solution (liquid A) in which 2.35 mol of aluminum nitrate nonahydrate, 0.3 mol of zirconyl nitrate dihydrate, 0.3 mol of cerium nitrate (III), 0.05 mol of barium nitrate and 5768 ml of deionized water were mixed together, and another aqueous solution (liquid B) in which 8.99 mol of ammonia water, 0.075 mol of ammonium carbonate and 2400 ml of deionized water were mixed together were prepared, respectively. The durability of the catalyst thus prepared was evaluated. The characteristics of this catalyst are also shown in TABLE 1.

Embodiment 5:

A catalyst was prepared by the method similar to that of Embodiment 1 except that an aqueous solution (liquid A) in which 2.354 mol of aluminum nitrate nonahydrate, 0.35 mol of zirconyl nitrate dihydrate, 0.35 mol of cerium nitrate (III), 0.05 mol of barium nitrate, and 5768 ml of deionized water were mixed together, and another aqueous solution (liquid B) in which 89.25 mol of ammonia water, 0.075 mol of ammonium carbonate and 2400 ml of deionized water were mixed together were prepared, respectively. The durability of the catalyst thus prepared was evaluated. The characteristics of this catalyst are also shown in TABLE 1.

Embodiment 6:

A catalyst carrier which was coated with 150 g of composite oxide obtained in Embodiment 1 per liter of catalyst volume was prepared. The catalyst carrier thus prepared was immpersed in an aqueous solution of platinum nitrate to adsorb and carry 1.5 g of platinum per liter of catalyst volume, dried and fired at 500° C. for 1 hour.

Then, the catalyst carrier carrying platinum was coated with the composite oxide obtained by the method similar to that of Embodiment 1 except that no cerium nitrate (III) was added, in the amount of 65 g per liter of catalyst volume. Next, the catalyst carrier thus coated was immersed in an aqueous solution of rhodium nitrate to adsorb and carry 0.3 g of rhodium per liter of catalyst volume, dried and fired at 250° C. for 1 hour. Thus, a double layer-coated and noble metal-carrying catalyst was obtained. The characteristics of this catalyst are also shown in TABLE 1.

Embodiment 7:

A composite oxide powder was formed by the method similar to that of Embodiment 2 except that the liquid A was prepared from the mixture of 0.5 mol of aluminum nitrate nonahydrate, 0.25 mol of zirconyl nitrate dihydrate, 0.25 mol of cerium nitrate (III), 0.02 mol of lanthanum nitrate, and 2 liter of deionized water. 100 parts of the composite oxide powder thus formed was mixed with 50 parts of heat resistant active alumina on the market to prepare a composite oxide. Then, a catalyst carrier having a coated layer of the composite oxide thus obtained in the amount of 150 g per liter of catalyst volume was prepared, and immpersed in an aqueous solution of platinum nitrate to adsorb and carry 1.5 g of platinum per liter of catalyst volume. Then, after drying, the catalyst carrier carrying platinum was fired at 500° C. for 1 hour.

Next, the catalyst carrier thus fired was coated with the composite oxide obtained by the method similar to that of Embodiment 2 except that no cerium nitrate (III) and lanthanum nitrate was added, in the amount of 65 g per liter of catalyst volume. The catalyst carrier thus coated was immersed in an aqueous solution of rhodium nitrate to adsorb and carry 0.3 g of rhodium per liter of catalyst volume, dried and fired at 250° C. for 1 hour. Thus, a double layer-coated and noble metal-carrying catalyst was obtained. The characteristics of this catalyst are also shown in TABLE 1.

COMPARATIVE EXAMPLE 1:

A catalyst was prepared by the method similar to that of Embodiment 1 except that the liquids A and B were added slowly (in about 1 minute) while measuring the pH value without using the high speed mixing means. The characteristics of this catalyst are also shown in TABLE 1.

Evaluation of catalytic property:

The catalysts, each having a catalyst volume of 1.7 liter, which were prepared in Embodiments 1 through 7, were respectively installed in an exhaust pipe of an automobile provided with a gasoline engine having a cylinder volume of 2 liters, and an accelerated endurance running test was carried out at about 980° C. which is the maximum catalyst bed temperature, simulating the European running, for 200 hours. Next, analysis of exhaust gases discharged while simulating the European running was carried out at both the upper stream and downstream of each catalyst, and the average ratios of purification of the components of the exhaust gases (NOx, HC, CO) were measured. As a result, the average ratios of purification of the catalysts were as high as 95, 94, 96, 96, 97, 98, 98% in the order from Embodiment 1 to Embodiment 7.

Similarly, the average ratio of purification of the catalyst of Comparative example 1 was also measured. As aresult, Comparative example 1 exhibited a low average rate of 83%, as compared to the catalysts of the present embodiments.

Embodiment 8:

Mixing step:

The liquids A and B which were respectively identical to those of Embodiment 1 were mixed homogeneously within two seconds by stirring at a high speed, similarly to Embodiment 1, to precipitate a precursor of composite oxide.

Separating step:

The following decantation step was performed. While stirring a mixed liquid containing the above-described precursor, an aqueous solution in which 0.5 g of ammonium carbonate was dissolved per liter of deionixed water was added thereto to dilute a resultant liquid to five times. 12 liter of an aqueous solution containing 0.1% of a high-molecular coagulant (flocculant) (manufactured by SANYO CHEMICAL INDUSTRIES, LTD., trade name: Sanfloc) was added to a resultant diluted liquid. The diluted liquid was gently stirred uniformly at a rate of about 40 rpm and allowed to stand for about 20 minutes. Next, supernatant was eliminated therefrom. These steps were repeated several times, whereby the amount of impurities (ammonium nitrate) within the diluted liquid was reduced to 10% or less.

Then, an aqueous solution of a high-molecular coagulant (manufactured by SANYO CHEMICAL INDUSTIES, LTD., Trade name: Sanfloc) and surface active agent (polyoxyethylene alkyl ether) were respectively added in the amount of about 2% (solid component) of the weight of oxide fired, and filteration was performed with a filter press.

The aqueous solution of ammonium carbonate added during decantation serves to prevent the re-dissolution of barium carbonate precipitated.

Firing step:

The precursor of composite oxide thus separated was dried at 105° C. for about 20 hours, fired in a stream of a nitrogen gas at 650° C. for 1 hour, and fired in air at 650° C. for 1 hour. The precursor thus fired was pulverized to 100 mesh or less with a ball mill to obtain a powdered composite oxide.

The powdered composite oxide was subjected to the attriter treamtment by the method similar to that of Embodiment 1 until the average particle diameter of the secondary particles of the powdered composite oxide is reduced to $3\mu$ a mor less.

A monolith substrate of cordierite of 400 cells/inch was coated with a resultant slurry the composite oxide to obtain a catalyst carrier coated with 200 g of composite oxide carrier per liter of catalyst volume.

The catalyst carrier thus treated was immersed in an aqueous solution of platinum nitrate to adsorb and carry 1.5 g of platinum per liter of catalyst volume. The catalyst carrier carrying platinum was then dried, fired at 250° C. for 1 hour, and immersed in an aqueous solution of rhodium nitrate to adsorb and carry 0.3 g of rhodium per liter of catalyst volume. Next, the catalyst carrier carrrying platinum and rhodium was dried, fired at 250° C. for 1 hour to obtain a noble metal-carrying catalyst.

The catalyst thus obtained was subjected to a model endurance test in a stream of air at 1000° C. for 5 hours. Then, the characteristics of catalyst were analyzed.

As a result of the X-ray diffraction analysis, ceria and zirconia contained in the catalyst after endurance test were dissolved in a solid phase in alumina fine pores homogeneously. The diameter of each crystallite was 4.6 nm. Secondary particles, each having a particle diameter of 5 to 10 nm, were dispersed as a main component in a resultant alumina carrier homogeneously. No diffranction line due to barium was observed.

The oxygen storage capacity (OSC) of this catalyst at 300° C., 500° C. and 700° C. was 0.085, 0.113 and 0.121 mol of oxygen gas ($O_2$) per mol of ceria, respectively. The specific surface area of the composite oxide defining the carrier ranged from 73 to 85 $m^2$/g.

Embodiment 9:

A catalyst was prepared by the method similar to that of Embodiment 8 except that no separating step was included and the drying step was carried out at 200° C. The characteristics of this catalyst are also shown in TABLE 2.

Evaluation of catalytic property:

Catalysts composed of the carriers of Embodiments 8 and 9 and carrying catalytic metals, each having a catalyst volume of 1.7 liter, were respectively installed in an exhaust pipe of an automobile provided with a gasoline engine having a cylinder volume of 2 liters, and an accelerated endurance running test was performed at about 980° C. which is the maximum catalyst bed temperature, simulating the European running, for 200 hours. Next, analysis of the exhaust gases discharged while simulating the European running was carried out at both the upper stream and downstream of each catalyst, and the average rates of purification of the components of the exhaust gases (NOx, HC, CO) were measured. As a result, the average ratios of purification of the catalysts of Embodiments 8 and 9 were as high as 96 and 93%, as shown in TABLE 2.

Embodiment 10:

An aqueous solution (liquid A) in which 2.35 mol of aluminum nitrate nonahydrate, 0.25 mol of zirconium nitrate, 0.25 mol of cerium nitrate (III), 0.05 mol of barium nitrate, 1.5 g (metal component) of an aqueous solution of platinum nitrate, 0.3 g (metal component) of rhodium nitrate and 5800 ml of deionized water were mixed and dissolved, and a basic aqueous solution (liquid B) in which 8.4 mol of ammonia water, 0.075 mol of ammonium carbonate and 2400 ml of deionized water were mixed together were prepared, respectively. The liquids A and B thus prepared were mixed homogeneously within two seconds by stirring at a high speed to precipitate a precursor of composite oxide. To remove impurities (ammonium nitrate, for example) within the aqueous solution from which the precursor was precipitated, another aqueous solution in which 0.5 g of ammonium carbonate was dissolved per liter of deionized water was added to the aqueous solution containing the above-described precursor while stirring to dilute to five times. The diluted liquid was allowed to stand for 1 day and a supernatant liquid was eliminated therefrom. These decantation operations were repeated twice to reduce impurities (ammonium nitrate) within the aqueous solution to 10% or less.

Then, a high-molecular coagulant (manufactured by SANYO CHEMICAL INDUSTRIES, LTD., Trade name: Sanfloc) and surface active agent (polyoxyethylene alkyl ether) were respectively added in the amount of about 2% by weight (solid component) of the weight of the oxide fired, and filteration and separation step was performed with a filter press. The precursor of composite oxide thus separated was dried at 105° C. for about 20 hours, calcined in a nitrogen gas at 600° C. for 1 hour and fired at 650° C. for 1 hour. The precursor thus fired was pulverized with a ball mill to obtain a composite oxide.

Actually, liquids were prepared by using materials in the amount of integral multiples of the above-described amount, respectively. By calcining in a nitrogen gas, namely by firing the high-molecular coagulant and surface active agent in an atmosphere containing only a small amount of oxygen, the precursor is brought into a reduced state to enhance the rate

TABLE 2

| Sample | state of solid solution of ceria & zirconia | diameter of crystallite nm | diameter of secondary particle nm | oxygen storage capacity $O_2$ mol/mol of ceria | | | Specific surface area $m^2$/g | average ratio of purification (%) |
| --- | --- | --- | --- | --- | --- | --- | --- | --- |
| | | | | 300° C. | 500° C. | 700° C. | | |
| Embodiment 8 | homogeneous | 4.6 | 5~10 | 0.085 | 0.113 | 0.121 | 80 | 96 |
| Embodiment 9 | homogeneous | 4.6 | 5~10 | 0.08 | 0.109 | 0.12 | 73 | 93 | of solid solution of ceria and zirconia and facilitate the precipitation of noble metals.

100 parts of the pulverized composite oxide was mixed with 100 parts of water, 20 parts of aluminum nitrate nonahydrate and 5 parts of boehmite, and stirred with an attriter for about two hours to obtain a catalyst slurry. A monolith substrate of cordierite of 400 cells/inch was coated

TABLE 3

| Sample | state of solid solution of ceria & zirconia | diameter of crystallite nm | diameter of secondary particle nm | oxygen storage capacity $O_2$ mol/mol of ceria | | | Specific surface area $m^2/g$ | average ratio of purification (%) |
|---|---|---|---|---|---|---|---|---|
| | | | | 300° C. | 500° C. | 700° C. | | |
| Embodiment 10 | homogeneous | 4.6 | 5~10 | 0.085 | 0.113 | 0.121 | 83 | 96 |
| Embodiment 11 | homogeneous | 5.3 | 5~10 | 0.078 | 0.106 | 0.12 | 75 | 95 |
| Embodiment 12 | homogeneous | 5.8 | 5~10 | 0.076 | 0.104 | 0.12 | 70 | 94 |
| Embodiment 13 | homogeneous | 4.8 | 5~10 | 0.082 | 0.112 | 0.12 | 69 | 96 |
| Embodiment 14 | homogeneous | 5.0 | 5~10 | 0.079 | 0.108 | 0.12 | 67 | 98 |
| Embodiment 15 | homogeneous (lower layer) | 4.6 | 5~10 | 0.082 | 0.111 | 0.12 | 76 | 98 |
| Embodiment 16 | homogeneous (lower layer) | 6.1 | 16 | 0.075 | 0.11 | 0.12 | 78 | 98 |
| Comparative example 2 | homogeneous | 8.0 | several $\mu$m | 0.03 | 0.05 | 0.12 | 80 | 82 | with this slurry to obtain a catalyst coated with 200 g of composite oxide per liter of catalyst volume.

The catalyst thus obtained was subjected to a model endurance test in a stream of air at 1000° C. for 5 hours. Then, the state of the catalyst was analyzed. This result is shown in TABLE 3.

As a result of the X-ray diffraction analysis, ceria and zirconia contained in the catalyst after endurance test were dissolved in a solid phase homogeneously. The diameter of each crystallite was 4.6 nm. Secondary particles, each having a particle diameter of 5 to 10 nm, were dispersed as a main component in a resultant alumina carrier homogeneously. No diffraction line caused by barium was observed.

The oxygen storage capacity (OSC) of this catalyst at 300° C., 500° C. and 700° C. was 0.08, 0.11 and 0.12 mol of oxygen gas ($O_2$) per mol of ceria, respectively. The specific surface area of this catalyst carrier was 83 $m^2/g$.

Similarly to the preceding embodiments, after decantation, filteration was carried out with a filter press until the amount of ammonium nitrate contained in a resultant pressed cake decreased to about 1%.

The aqueous solution of ammonium carbonate added during decantation serves to prevent the re-dissolution of barium carbonate precipitated.

The attriter used in the present embodiment is composed of a casing of zirconia, which has an inside volume of 6 liters, and 6 kg of zirconia balls, each having a diameter of 5 mm, which are filled in the casing. 2 kg of a raw material for a catalyst slurry was introduced within the casing thus arranged, rotary vanes of zirconia were rotated at a rate of 150 rpm therein, thereby further pulverizing and mixing the raw material of catalyst slurry until the particle diameter of the secondary particles of catalyst powder decreased to 3 $\mu$m or less on average.

In the present embodiment, the attriter thus arranged was used. Alternatively, the raw material of catalyst slurry may be introduced in a normally used ball mill, and pulverized while mixing. The pulverizing and mixing method is not limited specifically.

Embodiment 11:

A catlyst was prepared by the method similar to that of Embodiment 10 except that 0.05 mol of barium nitrate of Embodiment 10 was replaced with 0.05 mol of lanthanum nitrate hexahydrate, and an aqueous solution in which 9 mol of ammonia water and 2400 ml of deionized water were mixed was used as the liquid B. Then, the durability was evaluated. The state of this catalyst is shown in TABLE 3.

Embodiment 12:

A catalyst was prepared by the method similar to that of Embodiment 11 except that lanthanum nitrate hexahydrate of Embodiment 11 was not used. The catalyst thus prepared was evaluated similarly to Embodiment 11. The state of this catalyst is also shown in TABLE 3.

Embodiment 13:

A catalyst was prepared by the method similar to that of Embodiment 10 except that an aqueous solution (liquid A) in which 2.35 mol of aluminum nitrate nonahydrate, 0.3 mol of zirconyl nitrate dihydrate, 0.3 mol of cerium nitrate(III), 0.5 mol of barium nitrate, and 5768 ml of deionized water were mixed together, and another aqueous solution (liquid B) in which 8.99 mol of ammonia water, 0.075 mol of ammonium carbonate and 2400 ml of deionized water were mixed together were prepared, respectively. The durability of the catalyst thus prepared was evaluated. The state of the catalyst thus prepared is also shown in TABLE 3.

Embodiment 14:

A catalyst was prepared by the method similar to that of Embodiment 10 except that an aqueous solutiion (liquid A) in which 2.354 mol of aluminum nitrate nonahydrate, 0.35 mol of zirconyl nitrate dihydrate, 0.35 mol of cerium nitrate (III), 0.05 mol of barium nitrate, and 5800 ml of deionized water were mixed together, and another aqueous solution (liquid B) in which 9.25 mol of ammonia water, 0.075 mol of ammonium carbonate and 2400 ml of deionized water were mixed together were prepared. The durability of the catalyst thus prepared was evaluated. The state of this catalyst is also shown in TABLE 3.

Embodiment 15:

A composite oxide identical to that of Embodiment 10 except that no rhodium was added and the amount of platinum added was 2 g was prepared, and a catalyst coated with this composite oxide in the amount of 150 g per liter of catalyst volume was prepared. The catalyst thus prepared was dried and fired at 500° C. for 1 hour.

Then, the catalyst thus coated was further coated with the catalyst prepared by the method similar to that of Embodiment 10 except that no cerium nitrate (III) and no platinum were added, and the amount of rhodium added was 1.2 g, in the amount of 50 g per liter of catalyst volume. Next, the catalyst thus coated was dried and fired at 250° C. for 1 hour, whereby a double layer-coated catalyst was obtained. The state of the catalyst thus obtained is also shown in TABLE 3.

Embodiment 16:

A liquid A in which 0.5 mol of aluminum nitrate nonahydrate, 0.25 mol of zirconyl nitrate dihydrate, 0.25 mol of cerium nitrate (III), 0.02 mol of lanthanum nitrate, 2 liters of deionized water and platinum nitrate (0.5 g of platinum) were mixed together, and a liquid B in which ammonia water (2.9 mol of ammonia) and 1 liter of deionized water were mixed together, were prepared. The liquids A and B thus prepared were mixed homogeneously within two seconds by stirring at a high speed to precipitate a precursor of composite oxide.

The mixture liquid thus obtained was diluted to five times with deionixed water, and filter-pressed to obtain a cake containing a precursor of composite oxide. 0.1 liter of deionized water and 50 g of heat-resistant active alumina (γ-alumina) powder on the market, which contains secondary particles having the average diameter of 3 $\mu$m $\phi$ and of which the specific surface area was 150 m$^2$/g were mixed with the cake obtained, and kneaded together to be mixed homogeneously. The mixture thus obtained was dried in a stream of air at 150° C. , and fired in air at 650° C. for 1 hour. 100 parts of composite oxide thus prepared was mixed with 100 parts of water, 20 parts of aluminum nitrate nonahydrate and 5 parts of boehmite by stirring with an attriter for about two hours to obtain a slurry.

A monolith substrate of cordierite of 400 cells/inch was coated with the slurry thus prepared in the amount of 150 g of composite oxide per liter of catalyst volume. The monolith carrier thus coated was dried at 150° C. and fired at 650° C. for 1 hour.

Then, the monolith substrate thus fired was immersed in an aqueous solution of platinum nitrate to carry 1 g of platinum per liter of catalyst volume, dried at 150° C. and fired at 650° C. for 1 hour.

Furthermore, a liquid A in which 0.5 mol of aluminum nitrate nonahydrate, 0.25 mol of zirconium nitrate dihydrate, 1.5 liter of deionized water and rhodium nitrate (0.3 g of rhodium) were mixed together, and a liquid B in which ammonia water (2.1 mol of ammonia) and 0.5 liters of deionized water were mixed together, were prepared, respectively. The liquids A and B thus prepared were mixed homogeneously within two seconds by stirring at a high speed to precipitate a precursor of composite oxide.

The mixture liquid thus obtained was diluted to five times with deionized water and allowed to stand for one day. Then, supernatant was removed. Next, a high-molecular coagulant and surface active agent were respectively added in the amount of 2% by weight (solid component) of the weight of the oxide fired, and subjected to a filter press, thereby obtaining a cake containing a precursor of composite oxide.

The cake thus obtained was dried in a stream of air at 150° C., and fired in air at 650° C. for 1 hour. 100 parts of a composite oxide thus prepared was mixed with 100 parts of water, 20 parts of aluminum nitrate nonahydrate and 5 parts of boehmite by stirring with an atliter for about two hours to obtain a slurry. The monolith catalyst previously prepared was coated with this slurry in the amount of 57 g of composite oxide per liter of catalyst volume. Then, the monolith catalyst thus coated was further dried at 150° C. and fired at 650° C. for 1 hour, thus obtaining a double layer-coated platinum-rhodium carrying catalyst.

The durability and state of this catalyst were also evaluated similarly to that of Embodiment 10. The state of this catalyst is also shown in TABLE 3.

COMPARATIVE EXAMPLE 2

120 g of lanthanum-stabilized active alumina powder, 0.5 mol of ceria-zirconia composite oxide powder having metal atomic ratio of 1:1, 200 parts of water, 20 parts of aluminum nitrate nonahydrate, 10 parts of boehmite were mixed together, and stirred with an attriter for 2 hours to obtain a slurry for catalyst substrate. A monolith substrate of cordierite of 400 cells/inch was coated with the slurry thus prepared to obtain a catalyst carrier coated with 200 g of an oxide carrier per liter of catalyst volume. Then, the catalyst carrier thus obtained was immersed in an aqueous solution of platinum nitrate to carry 1.5 g of platinum per liter of catalyst volume, dried and fired at 250° C. for 1 hour. Next, the catalyst carrier carrying platinum was further immpersed in an aqueous solution of rhodium nitrate to adsorb and carry 0.3 g of rhodium per liter of catalyst volume, and dried and fired at 250° C. for 1 hour to obtain a noble metal-carrying catalyst.

The catalyst thus obtained was subjected to a model endurance test in a stream of air at 1000° C. for 5 hours. The state of the catalyst was analyzed. The analysis result is also shown in TABLE 3.

Evaluation of Purification Performance:

The catalysts, each having a catalyst volume of 1.7 liters, which were prepared in Embodiments 10 through 16, were respectively installed in an exhaust pipe of an automobile provided with a gasoline engine having a cylinder volume of 2 liters, and an accelerated endurance running test was perfomred at about 980° C. which is the maximum catalyst bed temperature, simulating the European running, for 200 hours. Next, exhaust gases discharged while simulating the European running were analyzed at both the upper stream and downstream of each catalyst, and the average ratios of purification of the components ($NO_x$, HC, CO) of the exhaust gases were measured. As a result, the average ratios of purification of the catalysts were as high as 96, 95, 94, 96, 98, 98, 98% in the order from Embodiment 10 to Embodiment 16.

Similarly, the average ratio of purification of the catalyst of Comparative example 2 was also measured. As a result, Comparative example 2 exhibited 82% which was lower than those of the catalysts of the present embodiments.

At a high temperature (700° C.), no difference in OSC was observed between the catalysts of the embodiments and that cf Comparative example 2. This shows that there is no large difference in saturated oxygen storage amount of ceria. In contrast, at a low temperature (300° C.), there was a difference by twice or more in OSC. It has been clarified by investigation that the OSC depends on the specific surface area of noble metals as active points. Accordingly, it can be considered that in the catalyst of the embodiments, noble metals uniformly disperse, as compared to the catalyst of the comparative example. A catalyst layer of each catalyst was scratched to obtain powder therefrom, and an X-ray diffraction analysis was performed. The analysis result showed that the diameter of noble metal particles of the catalyst of the embodiments was smaller than that of the catalyst of the comparative example.

It can be considered as one of the reasons for the small diameter of noble metal particles of the catalysts of the embodiments being maintained, and high heat resistance being achieved that noble metals can highly disperse in the carrier to restrain the coagulation of noble metal particles.

In contrast, in the catalyst of Comparative example 2, which carries noble metals in the later steps, noble metals are distributed in vicinity of the surface of the catalyst layer with high concentration and consequently, high concentration noble metals tend to coagulate during the endurance test.

Furthermore, it can be considered as one of the reasons for the OSC being low at a low temperature that the interaction between noble metals and ceria is low.

Embodiment 17:

Aluminum nitrate nonahydrate, zirconyl nitrate dihydrate, cerium nitrate (III), an aqueous solution of platinum nitrate, and an aqueous solution of rhodium nitrate were mixed together in the composition ratio identical to that of the endurance catalyst No. 215 shown in TABLE 4, and an ion-exchange water was added to a resultant mixture so as to contain 10% by weight (solid component) of oxide. After stirring sufficiently, 30% by weight of hydrogen peroxide solution, which is 1.5 times as much as the molar amount of cerium, was added to prepare an aqueous solution A.

30% by weight of ammonia water, which is 1.8 times as much as the quantity required to neutralize these nitrates was prepared as an aqueous solution B.

The aqueous solutions A and B were mixed together at a high speed within five seconds to obtain a precursor-containing slurry. The slurry thus obtained was introduced into a crucible, and allowed to stand within a kiln at 300° C. for 1 hour. Then, the temperature of kiln was raised to 650° C. at a rate of 600° C./h, and firing was carried out in air at 650° C. for 1 hour.

A resultant composite oxide (catalyst) was partly pulverized such that the diameter of secondary particles ranged from 0.5 to 1 mm, and then screened. A resultant pellet-like composite oxide was subjected to the endurance test under the conditions described below to obtain a catalyst No.215.

Endurance test condition: stoichiometric atmosphere until the temperature is raised to 1000° C.

(stoichiometric ) ↔ (5% $O_2$+stoichiometric)

period of variation 10 minutes, 1000° C., 5 h flow rate 1 (liter/min) for each gas, samples 8 kinds 2 g of each sample was introduced into a crucible and endurance test was conducted.

Embodiments 18 through 25 and 29, 30:

Endurance catalysts 216 through 223 and 231, 232, each having the composition ratio shown in TABLE 4, were prepared by the method similar to that of Embodiment 17 as catalysts of Embodiments 18 through 25 and 29, 30.

TABLE 4

| sample | endurance catalyst No. | common spec.: amount of noble metal added (Pt: 1.5 g/liter, Rh: 0.3 g/liter) | | | | | preparation method method ①: |
|---|---|---|---|---|---|---|---|
| | | carrier composition (mol/liter) | | | | | |
| | | ½ ($Al_2O_3$) | $CeO_2$ | $ZrO_2$ | ½ ($Y_2O_3$) | firing condition | coprecipitation → firing |
| Embodiment | | | | | | | |
| 17 | 215 | 2.2000 | 0.2500 | 0.2500 | | 650° C., 1 h, Air | ① |
| 18 | 216 | 2.2000 | 0.1667 | 0.3333 | | ↑ | ↑ |
| 19 | 217 | 2.2000 | 0.1250 | 0.3750 | | ↑ | ↑ |
| 20 | 218 | 1.6500 | 0.3875 | 0.3875 | | ↑ | ↑ |
| 21 | 219 | 1.6500 | 0.2583 | 0.5167 | | ↑ | ↑ |
| 22 | 220 | 1.6500 | 0.1938 | 0.5813 | | ↑ | ↑ |
| 23 | 221 | 1.1000 | 0.5250 | 0.5250 | | ↑ | ↑ |
| 24 | 222 | 1.1000 | 0.3500 | 0.7000 | | ↑ | ↑ |
| 25 | 223 | 1.1000 | 0.2625 | 0.7875 | | 650° C., 1 h, Air | ↑ |
| 26 | 227 | 1.1000 | 0.5250 | 0.5250 | | 650° C., 1 h, Air → 100° C., 2 h, $N_2$ + 5% $H_2$ | ↑ |
| 27 | 228 | 1.1000 | 0.3500 | 0.7000 | | ↑ | ↑ |
| 28 | 229 | 1.1000 | 0.2625 | 0.7875 | | 650° C., 1 h, Air → 100° C., 2 h, $N_2$ + 5% $H_2$ | ↑ |
| Comparative example 3 | 230 | powder (120 g) | (Ce,Zr)$O_2$ powder(0.5 mol) | | | | powder mixing → impregnation of mixture salt of Pt + Rh |
| 29 | 231 | 2.2000 | 0.2250 | 0.2250 | 0.0500 | 650° C., 1 h, Air | ① |
| 30 | 232 | 1.0000 | 1.0000 | 1.0000 | | ↑ | ↑ |

Noble metal amount added (Pt: 1.5 g/l, Rh: 0.3 g/l)

Embodiments 26 through 28:

Catalysts of Embodiments 23 through 25 prior to the endurance test were treated in an atmosphere of nitrogen gas and 5% of hydrogen gas at 1000° C. for 2 hours, and subjected to the endurance test similarly to Embodiments 23 through 25 to obtain endurance catalysts No. 227, 228 and 229.

COMPARATIVE EXAMPLE 3

120 g of lanthanum stabilized active alumina powder was mixed with 0.5 mol of ceria-zirconia composite oxide powder having a metal atomic ratio of 1:1. And a resultant mixture powder was added to a mixed aqueous solution of an aqueous solution of platinum nitrate (containing 1.5 g of platinum) and an aqueous solution of rhodium nitrate (containing 0.3 g of rhodium). A resultant slurry was evaporated, solidified, partly pulverized such that the diameter of secondary particles ranged from 0.5 to 1 mm, and screened. A resultant pellent-like composite oxide was subjected to the endurance test under the conditions similar to those of Embodiment 17 to obtain an endurance catalyst No. 230 of Comparative example 3.

The catalysts of Embodiments 17 through 30 and Comparative example 3 were evaluated on the oxygen storage capacity based on the atmosphere retention time during the atmosphere varying time. The evaluation result are shown in TABLE 5.

Evaluation condition: cycles of $1\%H_2+He$(100 ccm) 2.5 minutes and $1\%O_2+He$(90 ccm) 2.5 minutes Evaluation temperature: 300° C.→500° C.→700° C.→500° C.→300° C. (measuring for 13 minutes at each temperature)

Amount of sample: ½₀₀₀ (liter-cat) about 0.1 g

TABLE 5

| sample | endurance catalyst No. | atmosphere retention time (sec) | | | | |
|---|---|---|---|---|---|---|
| | | 300° C. | 500° C. | 700° C. | 500° C. | 300° C. |
| Embodiment | | | | | | |
| 17 | 215 | 4 | 22 | 28 | 24 | 19 |
| 18 | 216 | 2 | 16 | 24 | 20 | 13 |
| 19 | 217 | 2 | 13 | 17 | 15 | 10 |
| 20 | 218 | 16 | 36 | 43 | 37 | 32 |
| 21 | 219 | 11 | 30 | 37 | 32 | 24 |
| 22 | 220 | 11 | 23 | 29 | 23 | 17 |
| 23 | 221 | 31 | 45 | 55 | 47 | 38 |
| 24 | 222 | 11 | 34 | 43 | 36 | 27 |
| 25 | 223 | 12 | 26 | 34 | 27 | 22 |
| 26 | 227 | 54 | 61 | 71 | 64 | 55 |
| 27 | 228 | 27 | 43 | 54 | 44 | 33 |
| 28 | 229 | 20 | 29 | 42 | 30 | 19 |
| Comparative example 3 | 230 | 4 | 19 | 30 | 20 | 6 |
| 29 | 231 | 4 | 17 | 23 | 19 | 14 |
| 30 | 232 | 45 | 80 | 100 | 83 | 68 |

EVALUATION→

As compared to the catalyst of Comparative example 3, the catalysts of Embodiments 17 through 30 exhibited especially improved oxygen storage capacity at a low temperature (300° C.). And the catalysts containing a large amount of ceria exhibited high oxygen storage capacity at a high temperature, too.

Furthermore, as is apparent from the comparison between the catalysts of Embodiments 23 through 25 and those of Embodiments 26 through 28, the oxygen storage capacity can be improved due to the reduction treatment. By the reduction treatment, solid solution of ceria-zirconia is accelerated, noble met als are activated (precipitation and reduction) a the improvement of heat resistance of noble metals due to the presintering thereof is achieved, and other advantages are obtained.

In the composite oxide carrier in accordance with the present invention, homogeneous solid solution of ceria, zirconia, and zirconia fine particles disperse as primary particles in γ-alumina. This results in the characteristics of zirconia being effectively used, the stability of noble metals and dispersing characteristics of each element being improved. Therefore, OSC at the evaluation temperature of 300° C. is improved by about twice or more, as compared to the conventional carrier. By the action of fine zirconia particles, the composite oxide carrier catalyst exhibits an excellent heat resistance and carries noble metals stably so as to be useful as the catalyst for reducing exhaust gases, which has an excellent sulfur poisoning resistance.

In addition, the composite oxide and the method for preparing the same in accordance with the present invention is applicable to materials for sensors, batteries, optical materials, semiconductor materials, structure materials or other broad technical fields.

While the invention has been described in connection with what are considered presently to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A composite oxide carrier manufactured by the method comprising the steps of:

forming a precursor of oxides of elements of aluminum and at least one of cerium and zirconium, by mixing a solution of salts of said elements with an alkaline solution; and then firing said precursor to form a composite oxide carrier of alumina and at least one of ceria, zirconia and ceria-zirconia composite oxide, wherein said mixing is carried out over a period of time such that the composite oxide carrier has the following property;

after subjecting the composite oxide carrier to heating in air at 1000° C. for 5 hours, x-ray diffraction analysis reveals that the at least one of ceria, zirconia, and ceria-zirconia composite oxide has a crystallite diameter of 10 nm or less and part of the at least one of ceria, zirconia, and ceria-zirconia composite oxide is present as a secondary particle dispersed in the alumina.

2. A composite oxide carrier as claimed in claim 1, wherein said elements further include at least one element selected from the group consisting of alkali metals, alkaline earth metals, transition metals, and rare earth elements.

3. A composite oxide carrier as claimed in claim 1, wherein said solution of salts of said elements is added with at least one additive selected from the group consisting of a high-molecular coagulant, hydrogen peroxide, surface active agent and a water-soluble polymer.

4. A composite oxide carrier as claimed in claim 3, wherein the additive is at least one selected from the group consisting of a cationic polymer, an anionic polymer or a nonionic polymer.

5. A composite oxide carrier as claimed in claim 3, wherein the additive is a nonionic polymer.

6. A composite oxide carrier as claimed in claim 3, wherein the additive is a surface active agent that is polyoxyethylene alkyl ether.

7. A composite oxide carrier as claimed in claim 3, wherein the additive is a water-soluble polymer that is a cellulose polymer or polyvinyl alcohol.

8. A composite oxide carrier as claimed in claim 1, wherein said mixing is carried out while pouring the alkaline solution into the solution of salts, or vice-versa.

9. A composite oxide carrier as claimed in claim 8, wherein said mixing is carried out by pouring the alkaline solution and the solution of salts into a mixing device.

10. A composite oxide carrier as claimed in claim 9, wherein said mixing device has a rotary plate or a rotary vane.

11. A composite oxide carrier as claimed in claim 1, comprising Al, Ce and Zr whose atomic ratio ranges from 1:0.01 to 1:5 as represented by Al:(Ce+Zr).

12. A composite oxide carrier as claimed in claim 11, wherein the ratio ranges from 1:0.05 to 1:2.

13. A composite oxide carrier as claimed in claim 12, wherein the ratio range from 1:0.2 to 1:2, and the atomic ratio of Ce:Zr range from 1:0.2 to 1:5.

14. A composite oxide carrier as claimed in claim 13, wherein said atomic ratio of Ce: Zr ranges from 1:0.8 to 1:1.25.

15. A composite oxide carrier as claimed in claim 1, comprising Al and Zr whose atomic ratio ranges from 1:0.01 to 1:5.

16. A composite oxide carrier as claimed in claim 15, wherein the atomic ratio of Al:Zr ranges from 1:0.02 to 1:2.

17. A composite oxide carrier as claimed in claim 1, comprising Al, Zr and at least one other metal element whose atomic ratio ranges from 1:0.01 to 1:0.2 as represented by (Al+Zr): said other metal element.

18. A composite oxide carrier as claimed in claim 1, wherein said step of firing is carried out in a reducing atmosphere at 500° C. or more.

19. A composite oxide carrier as claimed in claim 18, wherein said step of firing is carried out in a reducing atmosphere at 900° C. or more.

20. A composite oxide catalyst manufactured by the method comprising the steps of:

forming precursors of oxides of elements of aluminum and at least one of cerium and zirconium, and a catalyst metal, by mixing a solution including salts of said elements and a salt of said catalyst metal with an alkaline solution to form precipitates of said precursors from said mixed solution; and firing said precipitated precursors to form a composite oxide catalyst of alumina and at least one of ceria, zirconia, and ceria-zirconia composite oxide, and the catalyst metal, wherein said mixing is carried out over a period of time such that the composite oxide catalyst has the following property;

after subjecting the composite oxide catalyst to heating in air at 1000° C. for 5 hours. x-ray diffraction analysis reveals that the at least one of ceria, zirconia, and ceria-zirconia composite oxide has a crystallite diameter of 10 nm or less and part of the at least one of ceria, zirconia, and ceria-zirconia composite oxide is present as a secondary particle dispersed in the alumina.

21. A composite oxide catalyst as claimed in claim 20, wherein said catalyst metal is at least one of platinum, palladium and rhodium.

22. A composite oxide catalyst as claimed in claim 21, wherein said step of firing is carried out in a reducing atmosphere at 500° C. or more.

23. A composite oxide catalyst as claimed in claim 22, wherein said step of firing is carried out in a reducing atmosphere at 900° C. or more.

24. A composite oxide as claimed in claim 3, wherein said composite oxide is $Al_2O_3/(Ce, Zr)O_2$, $Al_2O_3/ZrO_2$, or $Al_2O_3/CeO_2$ or the combination thereof.

25. A composite oxide carrier as claimed in claim 1, wherein said solution of salts of said elements includes at least zirconium and aluminum.

26. A composite oxide carrier according to claim 1 comprising Al, Ce and Zr whose atomic ratio ranges from 1:0.2 to 1:2 as represented by Al:(Ce+Zr), and in which the atomic ratio of Ce:Zr ranges from 1:0.2 to 1:5.

27. A composite oxide carrier according to claim 1 comprising Al, Ce and Zr in which the atomic ratio of Al:Zr ranges from 1:2 to 1:0.02.

28. A double layer coated catalyst for purifying exhaust gases comprising:

the composite oxide carrier manufactured by the steps of claim 1. loaded with a catalyst metal including at least one noble metal selected from the group consisting of rhodium, palladium and platinum to form a first layer coated catalyst;

which first layer coated catalyst has been coated with a second layer formed by said steps to form a second composite oxide carrier containing said first layer coated catalyst, which has been subsequently loaded with at least one different noble metal selected from the group consisting of rhodium, platinum and palladium.

29. A composite oxide manufactured by the method comprising the steps of:

forming a precursor of oxide of elements from an aqueous solution of salts of said elements within several seconds; and then firing said precursor, wherein said composite oxide is $Al_2O_3/(Ce, Zr)O_2$.

30. A composite oxide carrier as claimed in claim 1, wherein 60% or more of the total amount of said at least one of ceria, zirconia, and ceria-zirconia composite oxide is present as said secondary particle with a particle diameter of 30 nm or less.

31. A composite oxide carrier as claimed in claim 1, wherein said composite oxide carrier comprises said alumina and said ceria-zirconia composite oxide.

32. A composite oxide carrier as claimed in claim 31, wherein said ceria-zirconia composite oxide is a homogeneous solid solution of ceria and zirconia.

\* \* \* \* \*